(No Model.)

N. MOYER.
BEER BUNG.

No. 561,336. Patented June 2, 1896.

Witnesses
Carrie Kelly
Florence Kelly

Nathaniel Moyer, Inventor
By Attorney

United States Patent Office.

NATHANIEL MOYER, OF MAHANOY CITY, PENNSYLVANIA.

BEER-BUNG.

SPECIFICATION forming part of Letters Patent No. 561,336, dated June 2, 1896.

Application filed March 12, 1896. Serial No. 582,856. (No model.)

*To all whom it may concern:*

Be it known that I, NATHANIEL MOYER, a citizen of the United States, residing at Mahanoy City, in the county of Schuylkill and State of Pennsylvania, have invented certain new and useful Improvements in Beer-Bungs; and I do hereby declare the following to be a full, clear, and exact description of the invention, such as will enable others skilled in the art to which it appertains to make and use the same.

This invention relates to improvements in beer bungs or taps for drawing liquid from barrels or casks, the object of the invention being to produce a bung that will be less likely to become disordered than those now in use by reason of the simplicity of construction, a further object being to have the parts so arranged as to protect them from any shock caused by driving the bung into the barrel.

The invention is fully described in the following specification and is clearly shown in the accompanying drawings.

Figure 1:
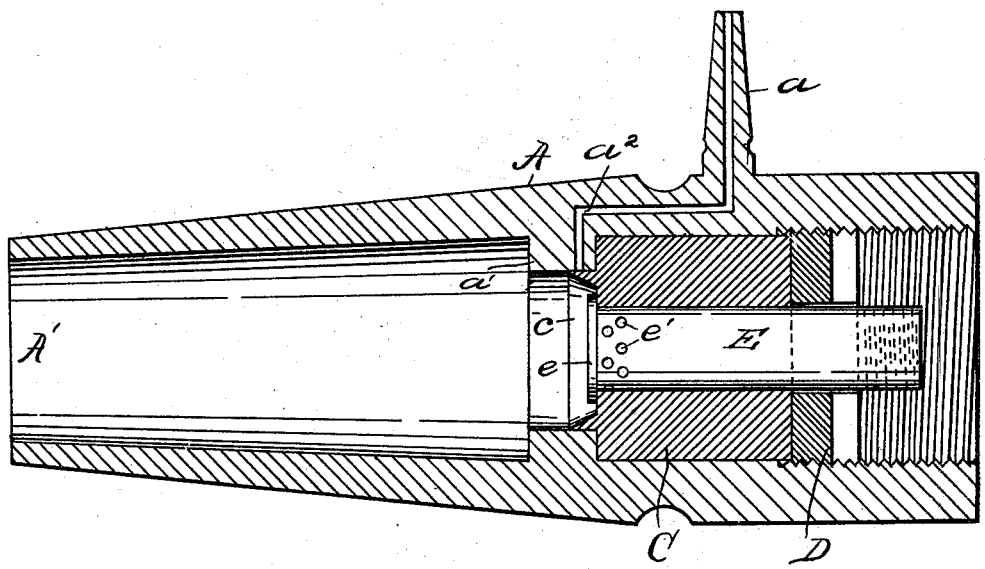
Figure 2:

Figure 1 is a sectional view of my improved bung. Fig. 2 is a detail of the end of the delivery-tube.

The casing or body A of the bung is cast in one piece and is provided with the usual air-inlet $a$. On the inside of the casing is provided a circular ledge $a'$, against which rests a rubber cylinder C, which also fits snugly against the inner face of the casing and which is provided with a depending circular lip $c$, which covers the air-inlet $a^2$. This cylinder is held in position by means of a suitable nut D, inserted from the large end of the casing.

A short pipe E, with its inner end closed and provided with a flange $e$, runs snugly through the center of the cylinder C and projects beyond the nut D. Its upper end, which remains inside of the end of the casing, is screw-threaded on its inside. Its inner end is provided also with openings $e'$, arranged in circular series just sufficiently above the flange $e$ to bring them within the opening of the cylinder C when the pipe is pulled into position.

The delivery-pipe F is screw-threaded at its one end and is adapted to enter the screw-threaded end of the pipe E.

The operation of the invention is as follows: When it is desired to tap a barrel of liquid, the tapered end A' of the bung is driven into the bung-hole, the air-pressure attachment is made to the inlet $a$, and the delivery-pipe F, which is screw-threaded on its outer face, is entered into the screw-threaded end of the pipe E. When this connection has been made, the downward pressure of the pipe F will release the pipe E from the rubber cylinder C, and the perforated end $e'$ of said pipe E will enter the liquid to be drawn. The air-pressure is then put on, and the air entering the opening $a^2$ will force away the lip $c$, which rests against the opening $a^2$, and the liquid can be freely drawn. When the air-pressure is relieved, the lip $c$ will effectually close the opening $a^2$. When it is desired to withdraw the delivery-pipe F, all that is necessary is to pull it up until the flange $e$ is seated against the end of the cylinder C, thus bringing the holes $e'$ inside of the cylinder and effectually closing the bung. The pipe F can then be unscrewed and removed, if desired.

It will be seen that in my improved bung there are no valves, springs, or other complicated parts to become disordered, the invention being very simple in construction and very effective.

What I claim, and desire to secure by Letters Patent, is—

In a beer bung or tap the one-piece casing with air-inlet $a$ and internal circular ledge $a'$, a cylinder C of rubber resting against said ledge and backed by a nut D, said cylinder having a depending circular lip $c$ for closing the air-opening $a^2$, a pipe E having its inner end closed and formed with a circular flange $e$ which rests against said cylinder, and a series of openings $e'$ arranged in said inner end, the outer end being screw-threaded internally, all substantially as and for the purpose set forth.

In testimony whereof I affix my signature in presence of two witnesses.

NATHANIEL MOYER.

Witnesses:
ED. A. KELLY,
CARRIE KELLY.